N. W. GODFREY.
Dumping-Wagon.

No. 68,977. Patented Sept. 17, 1867

Witnesses:
Theo Tusche
Wm Trewin

Inventor:
N. W. Godfrey
Per Munn & Co
Attorneys

United States Patent Office.

N. W. GODFREY, OF LOCUST VALLEY, NEW YORK.

*Letters Patent No. 68,977, dated September 17, 1867.*

IMPROVEMENT IN DUMPING-CARTS.

*The Schedule referred to in these Letters Patent and making part of the same.*

TO ALL WHOM IT MAY CONCERN:

Be it known that I, N. W. GODFREY, of Locust Valley, in the county of Queens, and State of New York, have invented a new and improved Cart; and that the following description, taken in connection with the accompanying drawings, hereinafter referred to, forms a full and exact specification of the same, wherein I have set forth the nature and principles of my said improvements, by which my invention may be distinguished from all others of a similar class, together with such parts as I claim and desire to have secured to me by Letters Patent.

The present invention principally relates to an improved construction of the bottom of a cart or wagon, the former more particularly, whereby, when so desired, it can be simultaneously opened at various points of its length and width for dumping the material contained in it upon the ground or other desired locality or place, and in the most easy, convenient, and ready manner. In the accompanying plate of drawings my improved cart or wagon is illustrated—

Figure 2:
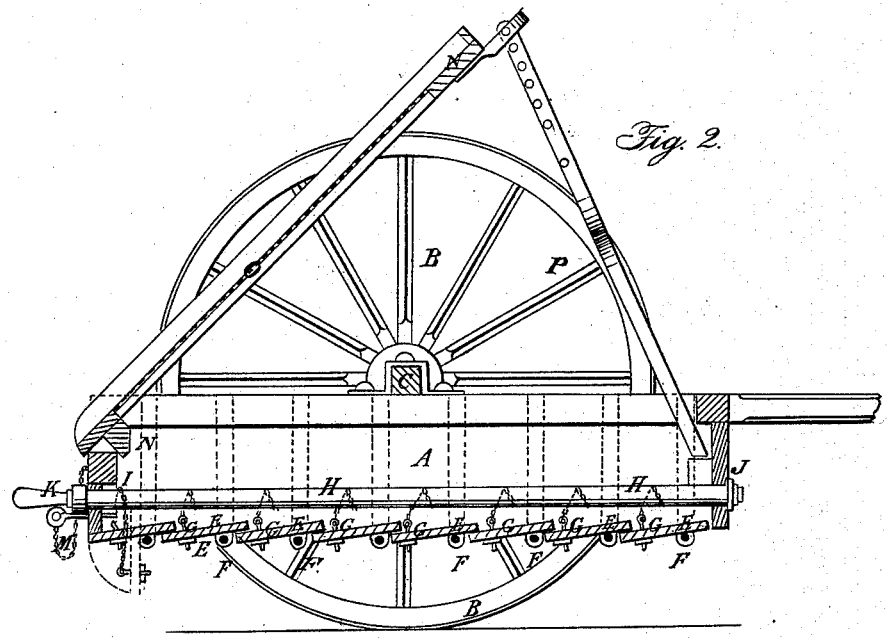
Figure 1:
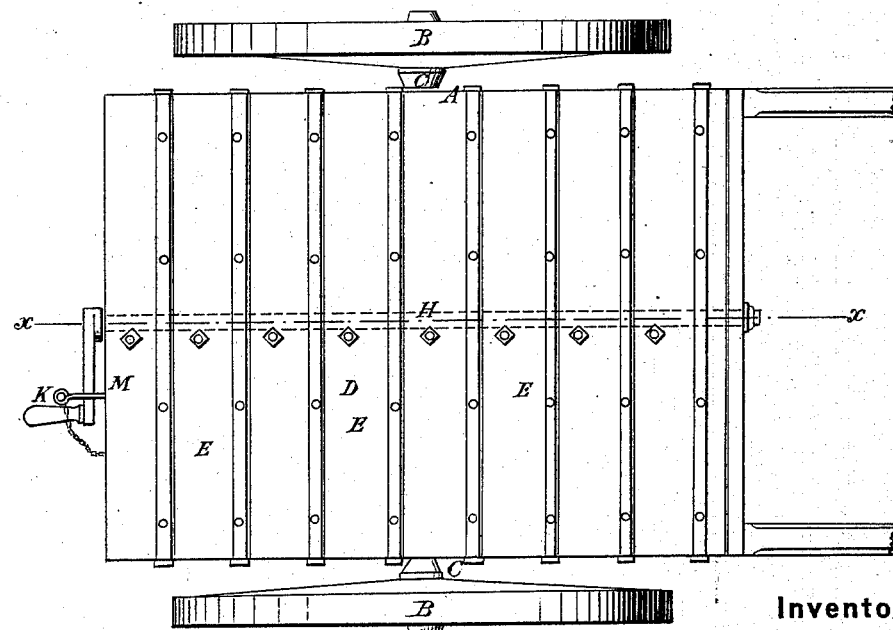

Figure 1 being a plan or top view of a cart made according to the present invention, and Figure 2 a central longitudinal vertical section, taken in the plane of the line $x\ x$, fig. 1.

Similar letters of reference indicate like parts.

A, in the drawings, represents the body of the cart, supported upon each side and at points directly opposite to each other by wheels B, suitably hung to projecting arms or axles C thereof. D, the bottom to the cart, made of a series of sectional pieces, E, extending across its width, each of which sections is hung to fixed transverse rods F of the wagon or cart body, so as to turn thereon, they overlapping each other when closed or in the position shown in the drawings. Each and all the sections E of the bottom to the cart are hung by short chains G to a common rod or shaft, H, extending the length of the same, and turning at each end in the front and tail-boards I and J thereto. K, a crank-handle secured to the end of rod H, at the tail-board J, by means of which handle the said rod can be turned and thus set or leave the several sections of the bottom free to fall or drop from their own weight, or the weight of the material upon them, or to bring or raise them up to a closed position, where, by means of a stop-pin, M, inserted in the tail-board of the cart, at a suitable point to stop and hold the crank-handle from turning, they are held. N, a frame, provided with a wire screen or netting, O, of suitable size of openings, for screening dirt from stones and other large particles. P, a frame hinged to sieve-frame N, by which frame the sieve can be supported in an inclined position, whether more or less great. This sieve is intended to be used upon the wagon or cart, and when in position is to rest upon its tail-board, with the supporting frame bearing against its front board.

Having thus described my invention, I claim as new, and desire to secure by Letters Patent—

A cart or wagon having its bottom made in sections, and hung thereto with the rod, or equivalent, to which each section is connected, in combination with the screen and frame, when all constructed and arranged together substantially as and for the purpose described.

The above specification of my invention signed by me this 23d day of February, 1867.

N. W. GODFREY.

Witnesses:
WM. F. McNAMARA,
J. A. SERVICE.